(12) United States Patent
Cao

(10) Patent No.: US 12,072,768 B2
(45) Date of Patent: Aug. 27, 2024

(54) FLASHING APPARATUS, BOOTING AND RECOVERY APPARATUS, AND ELECTRONIC DEVICE

(71) Applicant: WINGTECH TECHNOLOGY (SHENZHEN) CO., LTD., Shenzhen (CN)

(72) Inventor: Jian Cao, Shenzhen (CN)

(73) Assignee: WINGTECH TECHNOLOGY (SHENZHEN) CO., LTD., Shenzhen (CN)

( * ) Notice: Subject to any disclaimer, the term of this patent is extended or adjusted under 35 U.S.C. 154(b) by 222 days.

(21) Appl. No.: 17/801,028

(22) PCT Filed: Feb. 19, 2021

(86) PCT No.: PCT/CN2021/076936
§ 371 (c)(1),
(2) Date: Aug. 19, 2022

(87) PCT Pub. No.: WO2021/164745
PCT Pub. Date: Aug. 26, 2021

(65) Prior Publication Data
US 2023/0115005 A1 Apr. 13, 2023

(30) Foreign Application Priority Data
Feb. 19, 2020 (CN) .......................... 202010102622.0
Feb. 19, 2020 (CN) .......................... 202020186635.6

(51) Int. Cl.
*G06F 11/00* (2006.01)
*G06F 11/14* (2006.01)

(52) U.S. Cl.
CPC ...... *G06F 11/1417* (2013.01); *G06F 11/1441* (2013.01); *G06F 2201/805* (2013.01)

(58) Field of Classification Search
CPC .......................... G06F 11/2028; G06F 11/1441
See application file for complete search history.

(56) References Cited

U.S. PATENT DOCUMENTS 7,702,896 B1 * 4/2010 Polyudov ................ G06F 8/654
714/36
8,707,019 B2 * 4/2014 Shroni ..................... G06F 8/654
713/2

(Continued)

FOREIGN PATENT DOCUMENTS

| CN | 102163071 A | 8/2011 |
| CN | 107145282 A | 9/2017 |

(Continued)

OTHER PUBLICATIONS

International Search Report and Written Opinion from PCT/CN2021/076936 dated May 19, 2021.

*Primary Examiner* — Amine Riad
(74) *Attorney, Agent, or Firm* — Calfee, Halter & Griswold LLP

(57) ABSTRACT

Provided are a flashing apparatus, a booting and recovery apparatus, and an electronic device, relating to the technical field of electronics. The flashing apparatus is applied to the electronic device. The electronic device includes a booting trigger module, a recovery trigger module, a booting control module and a recovery control module. The flashing apparatus includes a booting processing module and a recovery processing module electrically connected to the booting processing module; the booting trigger module and the recovery trigger module are both electrically connected to the booting control module through the booting processing module, and the booting trigger module and the recovery trigger module are both electrically connected to the recovery control module through the recovery processing module; and the booting processing module and the recovery pro- (Continued)

cessing module respectively control, according to a first trigger signal provided by the booting trigger module and a second trigger signal provided by the recovery trigger module, the booting control module to determine whether to perform a booting action and control the recovery control module to determine whether to perform a recovery action. The present disclosure can quickly and conveniently implement the booting action and the recovery action without a +/− volume button.

20 Claims, 5 Drawing Sheets

(56) References Cited

U.S. PATENT DOCUMENTS

| | | | |
|---|---|---|---|
| 9,891,996 B2 * | 2/2018 | Gopal | G06F 11/1417 |
| 10,056,897 B1 | 8/2018 | Jung-Tsun et al. | |
| 11,797,389 B2 * | 10/2023 | Yu | G06F 11/1433 |
| 2010/0082963 A1 * | 4/2010 | Li | G06F 8/65 713/2 |
| 2014/0223160 A1 * | 8/2014 | Kim | G06F 11/0793 717/170 |
| 2015/0019800 A1 * | 1/2015 | Ramirez | G06F 11/1433 711/103 |
| 2020/0210204 A1 * | 7/2020 | Arora | G06F 9/4408 |

FOREIGN PATENT DOCUMENTS

| | | |
|---|---|---|
| CN | 209170331 U | 7/2019 |
| CN | 111290312 A | 6/2020 |
| CN | 211319201 U | 8/2020 |
| IN | 110780611 A | 2/2020 |

* cited by examiner

FLASHING APPARATUS, BOOTING AND RECOVERY APPARATUS, AND ELECTRONIC DEVICE

CROSS-REFERENCE TO RELATED APPLICATION

The present application is based upon International Application No. PCT/CN2021/076936, filed on Feb. 19, 2021, and the entire contents thereof is incorporated herein by reference.

The present disclosure claims the priority of the Chinese patent application filed on Feb. 19, 2020 before the Chinese Patent Office with the application number of 202010102622.0 and the title of "FLASHING APPARATUS AND ELECTRONIC DEVICE", the entire contents of which are incorporated herein by reference.

The present disclosure claims the priority of the Chinese patent application filed on Feb. 19, 2020 before the Chinese Patent Office with the application number of 202020186635.6 and the title of "FLASHING APPARATUS, BOOTING AND RECOVERY APPARATUS, AND ELECTRONIC DEVICE", the entire contents of which are incorporated herein by reference.

TECHNICAL FIELD

The present disclosure relates to the technical field of electronics, and more particularly, to a flashing apparatus, a booting and recovery apparatus, and an electronic device.

BACKGROUND

Qualcomm 9008 mode is fully known as Qualcomm HS-USB QDloader9008. The 9008 mode is a download mode, and is also the lowest online mode of a Qualcomm platform.

A mobile phone of the Qualcomm platform generally enters the 9008 mode through the combination of a power-on button and a +/− volume button to carry out an action of flashing to realize system recovery.

In addition, at present, apparatuses for controlling booting and recovery of an electronic devices need to be powered at all times in order to ensure that the booting and recovery actions can be realized.

SUMMARY

In view of this, one object of the present disclosure includes providing a flashing apparatus, a booting and recovery apparatus and an electronic device, which can quickly and conveniently realize a booting action and a recovery action without a +/− volume button, and can reduce power losses and save electric energy.

To implement the foregoing object, the technical solutions employed by the embodiments of the present disclosure are as follows.

In a first aspect, an embodiment provides a flashing apparatus applied to an electronic device, wherein the electronic device includes a booting trigger module, a recovery trigger module, a booting control module and a recovery control module; the flashing apparatus includes a booting processing module and a recovery processing module electrically connected to the booting processing module;

the booting trigger module and the recovery trigger module are both electrically connected to the booting control module through the booting processing module, and the booting trigger module and the recovery trigger module are both electrically connected to the recovery control module through the recovery processing module;

the booting processing module is configured to provide, according to a first trigger signal provided by the booting trigger module and a second trigger signal provided by the recovery trigger module, a first control signal to the booting control module, so that the booting control module determines whether to perform a booting action according to the first control signal; and the recovery processing module is configured to provide, according to the first trigger signal and the second trigger signal, a second control signal to the recovery control module, so that the recovery control module determines whether to perform a recovery action according to the second control signal.

In an optional embodiment, the recovery processing module includes a first logic judgment unit, a bleeder circuit and a first comparison unit, the booting trigger module and the recovery trigger module are electrically connected to an input end of the first logic judgment unit respectively, an output end of the first logic judgment unit is electrically connected to an input end of an inverting unit of the booting processing module, the output end of the first logic judgment unit is also electrically connected to an input end of the first comparison unit and an input end of a second comparison unit of the booting processing module respectively through the bleeder circuit, the recovery trigger module is electrically connected to the input end of the first comparison unit, and an output end of the first comparison unit is electrically connected to the recovery control module;

the first logic judgment unit is configured to generate a first processing signal according to the first trigger signal and the second trigger signal;

the bleeder circuit is configured to perform voltage dividing processing on the first processing signal to generate a second processing signal; and the first comparison unit is configured to generate the second control signal according to the second processing signal and the second trigger signal.

In an optional embodiment, the first comparison unit includes a first comparator and a first resistor, an input end of the first comparator is electrically connected to both an output end of the bleeder circuit and the recovery trigger module, an output end of the first comparator is electrically connected to the recovery control module, one end of the first resistor is electrically connected to a power supply, and the other end of the first resistor is electrically connected between the output end of the first comparator and the recovery control module.

In an optional embodiment, the booting processing module further includes a second logic judgment unit, the booting trigger module and the recovery trigger module are electrically connected to an input end of the second logic judgment unit respectively, an output end of the second logic judgment unit is electrically connected to the input end of the second comparison unit, and an output end of the second comparison unit and an output end of the inverting unit are both electrically connected to the booting control module;

the second logic judgment unit is configured to generate a third processing signal according to the first trigger signal and the second trigger signal;

the second comparison unit is configured to generate a fourth processing signal according to the third processing signal and the second processing signal; and the inverting unit is configured to generate a fifth processing signal according to the first processing signal, so that the booting control module obtains the first control signal according to the fourth processing signal and the fifth processing signal.

In an optional embodiment, the booting processing module further includes a backflow prevention unit, and the second comparison unit and the inverting unit are both electrically connected to the booting control module through the backflow prevention unit;

the second comparison unit is configured to provide the fourth processing signal to the booting control module through the backflow prevention unit; and the inverting unit is configured to provide the fifth processing signal to the booting control module through the backflow prevention unit.

In an optional embodiment, the backflow prevention unit includes a first diode and a second diode, the output end of the inverting unit is electrically connected to an anode of the first diode, the output end of the second comparison unit is electrically connected to an anode of the second diode, and a cathode of the first diode and a cathode of the second diode are both electrically connected to the booting control module.

In an optional embodiment, the first trigger signal includes a non-booting signal, and the second trigger signal includes a recovery signal;

the first logic judgment unit is configured to generate a first logic judgment signal according to the recovery signal and the non-booting signal;

the bleeder circuit is configured to perform voltage dividing processing on the first logic judgment signal to generate a first voltage dividing signal;

the first comparison unit is configured to generate a first comparison signal according to the first voltage dividing signal and the recovery signal, so that the recovery control module performs the recovery action according to the first comparison signal;

the second logic judgment unit is configured to generate a second logic judgment signal according to the recovery signal and the non-booting signal;

the second comparison unit is configured to generate a second comparison signal according to the first voltage dividing signal and the second logic judgment signal; and the inverting unit is configured to generate a first inverting signal according to the first logic judgment signal, so that the booting control module performs the booting action according to the second comparison signal and the first inverting signal.

In an optional embodiment, the first trigger signal includes a booting signal, and the second trigger signal includes a non-recovery signal;

the first logic judgment unit is configured to generate a first logic judgment signal according to the booting signal and the non-recovery signal;

the bleeder circuit is configured to perform voltage dividing processing on the first logic judgment signal to generate a first voltage dividing signal;

the first comparison unit is configured to generate a third comparison signal according to the first voltage dividing signal and the non-recovery signal, so that the recovery control module does not perform the recovery action according to the third comparison signal;

the second logic judgment unit is configured to generate a second logic judgment signal according to the booting signal and the non-recovery signal;

the second comparison unit is configured to generate a second comparison signal according to the first voltage dividing signal and the second logic judgment signal; and the inverting unit is configured to generate a first inverting signal according to the first logic judgment signal, so that the booting control module performs the booting action according to the second comparison signal and the first inverting signal.

In an optional embodiment, the first logic judgment unit includes an OR gate, and the second logic judgment unit includes an AND gate.

According to the flashing apparatus provided by the embodiment of the present disclosure, the booting processing module provides, according to the first trigger signal provided by the booting trigger module and the second trigger signal provided by the recovery trigger module, the first control signal to the booting control module, so that the booting control module determines whether to perform the booting action according to the first control signal; and the recovery processing module provides, according to the first trigger signal and the second trigger signal, the second control signal to the recovery control module, so that the recovery control module determines whether to perform the recovery action according to the second control signal. It can be seen that the booting action and the recovery action can be performed by the booting trigger module, the recovery trigger module, the booting control module, the recovery control module and the flashing apparatus, and the booting action and the recovery action can also be guaranteed not to conflict.

In a second aspect, an embodiment of the present disclosure provides a booting and recovery apparatus applied to an electronic device, the electronic device includes a recovery trigger module, the booting and recovery apparatus includes a booting control module, a recovery control module and a power supply module, and the recovery trigger module, the power supply module, the recovery control module and the booting control module are electrically connected in sequence;

the power supply module is configured to provide a working voltage to the recovery control module according to a recovery signal provided by the recovery trigger module;

the power supply module is also configured to send a recovery processing signal to the recovery control module according to the recovery signal;

the recovery control module is configured to perform, in the case of receiving the working voltage, a recovery operation according to the recovery processing signal and send a booting processing signal to the booting control module according to the recovery processing signal; and the booting control module is configured to perform a booting operation according to the booting processing signal.

In an optional embodiment, the power supply module includes an inverter and a first power chip, the recovery trigger module is electrically connected to the first power chip and the recovery control module respectively through the inverter, and the first power chip is also electrically connected to the recovery control module;

the inverter is configured to perform inverting processing on the recovery signal to obtain the recovery processing signal; and the first power chip is configured to provide the working voltage to the recovery control module according to the recovery processing signal.

In an optional embodiment, the power supply module further includes a delay chip, and the inverter is electrically connected to the first power chip and the recovery control module respectively through the delay chip;

the delay chip is configured to perform delay processing on the recovery processing signal to obtain a delayed recovery processing signal;

the first power chip is configured to provide the working voltage to the recovery control module according to the delayed recovery processing signal;

the recovery control module is configured to perform, in the case of receiving the working voltage, a recovery operation according to the delayed recovery processing signal and send a booting processing signal to the booting control module according to the delayed recovery processing signal.

In an optional embodiment, the power supply module further includes a sixth diode, the delay chip is electrically connected to an anode of the sixth diode, and a cathode of the sixth diode is electrically connected to the first power chip.

In an optional embodiment, the booting and recovery apparatus further includes a first isolation module, and the recovery trigger module is electrically connected to the power supply module through the first isolation module;

the first isolation module is configured to perform isolation processing on the recovery signal to obtain an isolated recovery signal;

the power supply module is configured to provide the working voltage to the recovery control module according to the isolated recovery signal; and the power supply module is also configured to send the recovery processing signal to the recovery control module according to the isolated recovery signal.

In an optional embodiment, the first isolation module includes a first buffer, and the recovery trigger module is electrically connected to the power supply module through the first buffer. In an optional embodiment, the booting control module is also electrically connected to the power supply module; and the power supply module is configured to provide the working voltage to the recovery control module according to a first enable signal provided by the booting control module; wherein, the first enable signal is generated when the booting control module performs a booting operation. In an optional embodiment, the recovery control module includes a controller and a processor, an input end of the controller is electrically connected to the power supply module, a power supply end of the controller is electrically connected to the power supply module, a first output end of the controller is electrically connected to the processor, a second output end of the controller is electrically connected to the booting control module, and a third output end of the controller is electrically connected to the power supply module;

the controller is configured to control, in the case that the power supply end receives the working voltage, the processor to perform a recovery operation according to the recovery processing signal received by the input end of the controller;

the controller is also configured to send the booting processing signal to the booting control module according to the recovery processing signal;

the controller is also configured to, in the case of receiving the working voltage, send a second enable signal to the power supply module; and the power supply module is configured to continuously provide the working voltage to the controller according to the second enable signal.

In an optional embodiment, the electronic device further includes a booting trigger module, the booting and recovery apparatus further includes a second isolation module, and the booting trigger module is electrically connected to the booting control module through the second isolation module;

the second isolation module is configured to perform isolation processing on a booting signal provided by the booting trigger module to obtain an isolated booting signal; and the booting control module is configured to perform a booting operation according to the isolated booting signal.

According to the booting and recovery apparatus provided by the embodiment of the present disclosure, the power supply module provides, according to the recovery signal provided by the recovery trigger module, the working voltage to the recovery control module, and provides the recovery processing signal to the recovery control module at the same time; so that the recovery control module, in the case of receiving the working voltage, performs the recovery operation according to the recovery processing signal and sends the booting processing signal to the booting control module according to the recovery processing signal, so that the booting control module performs the booting operation according to the booting processing signal. It can be seen that the power supply module will only provide the working voltage to the recovery control module when the electronic device is performing the recovery operation, and the recovery control module can only perform the recovery operation after obtaining the working voltage. When the electronic device does not need to perform the recovery operation, the power supply module will not provide the working voltage to the recovery control module, so the recovery control module does not need to be powered on when the recovery control module does not need to perform the recovery operation, so the recovery control module will not consume the electric energy of the electronic device when the recovery control module does not need to perform the recovery operation, thus reducing the power losses of the electronic device and saving the electric energy.

In a third aspect, an embodiment provides an electronic device including a booting trigger module, a recovery trigger module, a booting control module, a recovery control module, and the flashing apparatus according to any one of the foregoing embodiments, or including the recovery trigger module and the booting and recovery apparatus according to any one of the foregoing embodiments.

To make the above objects, features and advantages of the present disclosure more obvious and easier to understand, the optional embodiments will be described in detail below in conjunction with the accompanying drawings.

BRIEF DESCRIPTION OF THE DRAWINGS

In order to more clearly illustrate the technical solutions of the embodiments of the present disclosure, the accompanying drawings that are required to describe the embodiments will be briefly introduced below. It should be understood that the accompanying drawings below only illustrate some embodiments of the present disclosure, and should not

Figure 1:
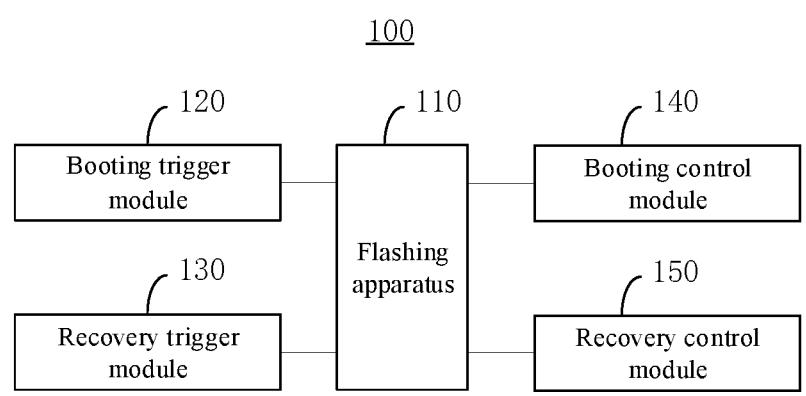
FIG. 1 illustrates a schematic structural diagram of an electronic device provided by an embodiment of the present disclosure.

Reference numerals: 100 refers to electronic device; 110 refers to flashing apparatus; 111 refers to recovery processing module; 1111 refers to first logic judgment unit; 1112 refers to bleeder circuit; 1113 refers to first comparison unit, 112 refers to booting processing module, 1121 refers to second logic judgment unit; 1122 refers to second comparison unit; 1123 refers to inverting unit; 113 refers to backflow prevention unit; 120 refers to booting trigger module; 130 refers to recovery trigger module; 140 refers to booting control module; 150 refers to recovery control module; R1 refers to first resistor; R2 refers to second resistor; R3 refers to third resistor; D1 refers to first diode; D2 refers to second diode; U1 refers to first comparator; 100A refers to booting and recovery apparatus; 160 refers to power conversion module; 170 refers to power supply module, 180 refers to first isolation module; 190 refers to second isolation module; U10 refers to inverter; U2 refers to first power chip; U3 refers to delay chip; U4 refers to first buffer; U5 refers to controller; U6 refers to processor; U7 refers to second buffer; U8 refers to second power chip; U9 refers to third power chip; D3 refers to third diode; D4 refers to fourth diode; D5 refers to fifth diode; D6 refers to sixth diode; D7 refers to seventh diode; C1 refers to first capacitor; R4 refers to fourth resistor; R5 refers to fifth resistor; and C2 refers to second capacitor.

DETAILED DESCRIPTION

The following clearly and completely describes the technical solutions in the embodiments of the present disclosure with reference to the accompanying drawings in the embodiments of the present disclosure. Apparently, the described embodiments are merely some but not all of the embodiments of the present disclosure. Components of the embodiments of the present disclosure, which are generally described and illustrated in the drawings herein, can be arranged and designed in various different configurations.

Therefore, the following detailed description of the embodiments of the present disclosure provided in the drawings is not intended to limit the scope of the present disclosure claimed, but merely represents selected embodiments of the present disclosure. Based on the embodiments of the present disclosure, all other embodiments obtained by those having ordinary skills in the art without going through any creative work shall fall within the scope of protection of the present disclosure.

It should be noted that relational terms such as "first" and "second" and the like, are used merely to distinguish one entity or operation from another entity or operation, and do not necessarily require or imply there is any such relationship or order between these entities or operations. Furthermore, the terms "including", "comprising" or any variations thereof are intended to embrace a non-exclusive inclusion, such that a process, a method, an article, or a device including a series of elements, includes not only those elements but also includes other elements not expressly listed, or also incudes elements inherent to such process, method, article, or device. In the absence of further limitation, an element defined by the phrase "including a . . . " does not exclude the presence of the same element in the process, method, article, or device. Qualcomm 9008 mode is fully known as Qualcomm HS-USB QDloader9008. The 9008 mode is a download mode, and is also the lowest online mode of a Qualcomm platform. A mobile phone of the Qualcomm platform generally enters the 9008 mode through the combination of a power-on button and a +/− volume button to carry out an action of flashing to realize system recovery. However, when the Qualcomm platform is used in some electronic devices (such as computers), because the electronic devices are not equipped with the +/− volume button, it is impossible to enter the 9008 mode by the combination of the power-on button and the +/− volume button.

Please refer to FIG. 1. FIG. 1 is an applicable schematic structural diagram of an electronic device 100 provided by an embodiment of the present disclosure. The electronic device 100 includes a booting trigger module 120, a recovery trigger module 130, a booting control module 140, a recovery control module 150 and a flashing apparatus 110. The booting trigger module 120 and the recovery trigger module 130 are electrically connected to the booting control module 140 and the recovery control module 150 respectively through the flashing apparatus 110.

In this embodiment, the booting trigger module 120 is configured to generate a first trigger signal in response to a user operation; the recovery trigger module 130 is configured to generate a second trigger signal in response to the user operation; the flashing apparatus 110 is configured to generate a first control signal and a second control signal according to the first trigger signal and the second trigger signal; the booting control module 140 is configured to determine whether to perform a booting action according to the first control signal; and The recovery control module 150 is configured to determine whether to perform a recovery action according to the second control signal.

The first trigger signal includes a booting signal and a non-booting signal, and the second trigger signal includes a recovery signal and a non-recovery signal. The booting trigger module 120 includes a power-on button, and the recovery trigger module 130 includes a recovery button.

When a pressing operation of a user on the power-on button is received, the power-on button will generate a booting signal. When a pressing operation of the user on the recovery button is received, the recovery button will generate a recovery signal. When no pressing operation of the user on the power-on button is received, the power-on button will generate a non-booting signal. When no pressing operation of the user on the recovery button is received, the recovery button will generate a non-recovery signal. Moreover, the booting signal may be low level (for example, 0 V), the non-booting signal may be high level (for example, 3.3 V), the recovery signal may be low level (for example, 0 V) and the non-recovery signal may be high level (for example, 3.3 V).

In this embodiment, a power chip (Power Management IC, PMIC) may be employed as the booting control module 140. The recovery control module 150 includes an Embedded Controller (EC) and a System on Chip (SOC).

In this embodiment, the electronic device 100 may be a notebook computer, a desktop computer, and the like.

Figure 2:
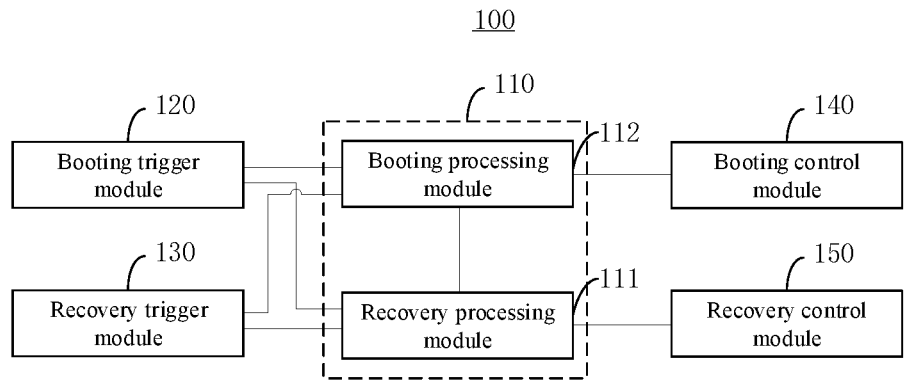
FIG. 2 illustrates a schematic structural diagram of a flashing apparatus provided by an embodiment of the present disclosure.

Please refer to FIG. 2, which is an applicable schematic structural diagram of the flashing apparatus 110 shown in FIG. 1. The flashing apparatus 110 includes a booting processing module 112 and a recovery processing module 111 electrically connected to the booting processing module 112. The booting trigger module 120 and the recovery trigger module 130 are both electrically connected to the booting control module 140 through the booting processing module 112, and the booting trigger module 120 and the recovery trigger module 130 are both electrically connected to the recovery control module 150 through the recovery processing module 111.

In this embodiment, the booting processing module 112 is configured to provide, according to a first trigger signal provided by the booting trigger module 120 and a second trigger signal provided by the recovery trigger module 130, a first control signal to the booting control module 140, so that the booting control module 140 determines whether to perform a booting action according to the first control signal; and the recovery processing module 111 is configured to provide, according to the first trigger signal and the second trigger signal, a second control signal to the recovery control module 150, so that the recovery control module 150 determines whether to perform a recovery action according to the second control signal. Please refer to FIG. 3, which is an applicable schematic circuit diagram of the flashing apparatus 110 shown in FIG. 2. The recovery processing module 111 includes a first logic judgment unit 1111, a bleeder circuit 1112 and a first comparison unit 1113. The booting trigger module 120 and the recovery trigger module 130 are electrically connected to an input end of the first logic judgment unit 1111 respectively, and an output end of the first logic judgment unit 1111 is electrically connected to the booting processing module 112. The output end of the first logic judgment unit 1111 is also electrically connected to an input end of the first comparison unit 1113 and the booting processing module 112 through the bleeder circuit 1112 respectively. The recovery trigger module 130 is electrically connected to the input end of the first comparison unit 1113, and an output end of the first comparison unit 1113 is electrically connected to the recovery control module 150.

It can be understood that the first logic judgment unit 1111 is configured to generate a first processing signal Boot_OR according to the first trigger signal PHONE_ON and the second trigger signal Recovery; the bleeder circuit 1112 is configured to perform voltage dividing processing on the first processing signal Boot_OR to generate a second processing signal Boot_OR_1; and the first comparison unit 1113 is configured to generate a second control signal Recovery_ON according to the second processing signal Boot_OR_1 and the second trigger signal Recovery.

In this embodiment, the first comparison unit 1113 includes a first comparator U1 and a first resistor R1. An input end of the first comparator U1 is electrically connected to both an output end of the bleeder circuit 1112 and the recovery trigger module 130, and an output end of the first comparator U1 is electrically connected to the recovery control module 150. One end of the first resistor R1 is electrically connected to a power supply, and the other end of the first resistor R1 is electrically connected between the output end of the first comparator U1 and the recovery control module 150.

In this embodiment, an OR gate may be employed as the first logic judgment unit 1111. The bleeder circuit 1112 includes a second resistor R2 and a third resistor R3. The output end of the first logic judgment unit 1111 is grounded through the second resistor R2 and the third resistor R3 connected in series. The input end of the first comparison unit 1113 and the booting processing module 112 are both electrically connected between the second resistor R2 and the third resistor R3.

In this embodiment, the booting processing module 112 includes a second logic judgment unit 1121, a second comparison unit 1122 and an inverting unit 1123. The booting trigger module 120 and the recovery trigger module 130 are electrically connected to an input end of the second logic judgment unit 1121 respectively. An output end of the second logic judgment unit 1121 and the bleeder circuit 1112 are electrically connected to an input end of the second comparison unit 1122 respectively. An output end of the second comparison unit 1122 and an output end of the inverting unit 1123 are both electrically connected to the booting control module 140. An input end of the inverting unit 1123 is electrically connected to the output end of the first logic judgment unit 1111.

It can be understood that the second logic judgment unit 1121 is configured to generate a third processing signal Boot_AND according to the first trigger signal PHONE_ON and the second trigger signal Recovery; the second comparison unit 1122 is configured to generate a fourth processing signal Boot_ON_2 according to the third processing signal Boot_AND and the second processing signal Boot_OR_1; and the inverting unit 1123 is configured to generate a fifth processing signal Boot_OR_according to the first processing signal Boot_OR, so that the booting control module 140 obtains the first control signal Boot_ON according to the fourth processing signal Boot_ON_2 and the fifth processing signal Boot_OR_2.

In this embodiment, an AND gate may be employed as the second logic judgment unit 1121. The second comparison unit second comparison unit 1122 includes a second comparator. An inverter may be employed as the inverting unit 1123.

In this embodiment, a specific principle for the flashing apparatus 110 to implement the booting action and the recovery action according to the first trigger signal and the second trigger signal is as follows: when the first trigger signal is a non-booting signal and the second trigger signal is a recovery signal, the first logic judgment unit 1111 is configured to generate a first logic judgment signal according to the recovery signal and the non-booting signal; the bleeder circuit 1112 is configured to perform voltage dividing processing on the first logic judgment signal to generate a first voltage dividing signal; the first comparison unit 1113 is configured to generate a first comparison signal according to the first voltage dividing signal and the recovery signal, so that the recovery control module 150 performs the recovery action according to the first comparison signal; the second logic judgment unit 1121 is configured to generate a second logic judgment signal according to the recovery signal and the non-booting signal; the second comparison unit 1122 is configured to generate a second comparison signal according to the first voltage dividing signal and the second logic judgment signal; and the inverting unit 1123 is configured to generate a first inverting signal according to the first logic judgment signal, so that the booting control module 140 performs the booting action according to the second comparison signal and the first inverting signal.

As shown in Table 1, when the first trigger signal PHONE_ON is a non-booting signal and the second trigger signal Recovery is a recovery signal, that is, the user triggers the recovery button, so that the recovery button generates a low-level recovery signal; since the user does not trigger the power-on button, the power-on button generates a high-level non-booting signal. The first logic judgment unit 1111 correspondingly generates a high-level first logic judgment signal according to the recovery signal and the non-booting signal, that is, the first processing signal Boot_OR at this time is the first logic judgment signal. The second logic judgment unit 1121 correspondingly generates a high-level second logic judgment signal according to the recovery signal and the non-booting signal, that is, the third processing signal Boot_AND at this time is the second logic judgment signal. The bleeder circuit 1112 performs voltage dividing processing on the first logic judgment signal to obtain a first voltage dividing signal with a level higher than that of the second logic judgment signal and the recovery signal, that is, the second processing signal Boot_OR_1 at this time is the first voltage dividing signal. The first comparison unit 1113 generates a low-level first comparison signal according to the first voltage dividing signal and the recovery signal, that is, the second control signal Recovery_ON at this time is the first comparison signal. The recovery control module 150 performs a recovery action according to the low-level second control signal Recovery_ON. The second comparison unit 1122 generates a low-level second comparison signal according to the first voltage dividing signal and the second logic judgment signal, that is, the fourth processing signal Boot_ON_2 at this time is the second comparison signal. The inverting unit 1123 generates a low-level first inverting signal according to the first logic judgment signal, that is, the fifth processing signal Boot_OR_2 at this time is the first inverting signal. Since the second comparison signal and the first inverting signal are input to the same port of the booting control module 140, and the first inverting signal and the second comparison signal are at low levels, the first control signal Boot_ON at this time is at a low level. The booting control module 140 performs the booting action according to the low-level first control signal Boot_ON.

In this embodiment, when the first trigger signal PHONE_ON is a booting signal and the second trigger signal Recovery is a non-recovery signal, the first logic judgment unit 1111 is configured to generate a first logic judgment signal according to the booting signal and the non-recovery signal; the bleeder circuit 1112 is configured to perform voltage dividing processing on the first logic judgment signal to generate a first voltage dividing signal; the first comparison unit 1113 is configured to generate a third comparison signal according to the first voltage dividing signal and the non-recovery signal, so that the recovery control module 150 does not perform the recovery action according to the third comparison signal; the second logic judgment unit 1121 is configured to generate a second logic judgment signal according to the booting signal and the non-recovery signal; the second comparison unit 1122 is configured to generate a second comparison signal according to the first voltage dividing signal and the second logic judgment signal; and the inverting unit 1123 is configured to generate a first inverting signal according to the first logic judgment signal, so that the booting control module 140 performs the booting action according to the second comparison signal and the first inverting signal.

As shown in Table 2, when the first trigger signal PHONE_ON is a booting signal and the second trigger signal Recovery is a non-recovery signal, that is, the user triggers the power-on button, so that the power-on button generates a low-level booting signal; since the user does not trigger the recovery button, the recovery button generates a high-level non-recovery signal. The first logic judgment unit 1111 correspondingly generates a high-level first logic judgment signal according to the non-recovery signal and the booting signal, that is, the first processing signal Boot_OR at this time is the first logic judgment signal. The second logic judgment unit 1121 correspondingly generates a low-level second logic judgment signal according to the non-recovery signal and the booting signal, that is, the third processing signal Boot_AND at this time is the second logic judgment signal. The bleeder circuit 1112 performs voltage dividing processing on the first logic judgment signal to obtain a first voltage dividing signal with a level higher than that of the second logic judgment signal, that is, the level of the first voltage dividing signal is lower than that of the non-recovery signal, that is, the second processing signal Boot_OR_1 at this time is the first voltage dividing signal. The first comparison unit 1113 generates a high-level third comparison signal according to the first voltage dividing signal and the non-recovery signal, that is, the second control signal Recovery_ON at this time is the third comparison signal. The recovery control module 150 does not perform the recovery action according to the high-level second control signal Recovery_ON. The second comparison unit 1122 generates a low-level second comparison

TABLE 1

| Booting trigger module | Recovery trigger module | First logic judgment unit | Bleeder circuit | First comparison unit | Second logic judgment unit | Second comparison unit | Inverting unit | Action of electronic device |
|---|---|---|---|---|---|---|---|---|
| Non-Booting signal-1 | Recovery signal-0 | First logic judgment signal-1 | First voltage dividing signal | First comparison signal-0 | Second logic judgment signal-0 | Second comparison signal-0 | First Inverting signal-0 | Perform booting and recovery actions | signal according to the first voltage dividing signal and the second logic judgment signal, that is, the fourth processing signal Boot_ON_2 at this time is the second comparison signal. The inverting unit 1123 generates a low-level first inverting signal according to the first logic judgment signal, that is, the fifth processing signal Boot_OR_2 at this timent is the first inverting signal. Since the second comparison signal and the first inverting signal are input to the same port of the booting control module 140, and the first inverting signal and the second comparison signal are at low levels, the first control signal Boot_ON at this time is at a low level. The booting control module 140 performs the booting action according to the low-level first control signal Boot_ON.

generates a low-level third logic judgment signal according to the recovery signal and the booting signal, that is, the first processing signal Boot_OR at this time is the third logic judgment signal. The second logic judgment unit 1121 correspondingly generates a low-level second logic judgment signal according to the recovery signal and the booting signal, that is, the third processing signal Boot_AND at this time is the second logic judgment signal. The bleeder circuit 1112 performs voltage dividing processing on the third logic judgment signal to obtain a second voltage dividing signal with a level higher equal to that of the second logic judgment signal and the recovery signal, that is, the second processing signal Boot_OR_1 at this time is the second voltage dividing

TABLE 2

| Booting trigger module | Recovery trigger module | First logic judgment unit | Bleeder circuit | First comparison unit | Second logic judgment unit | Second comparison unit | Inverting unit | Action of electronic device |
|---|---|---|---|---|---|---|---|---|
| Booting signal-0 | Non-recovery signal-1 | First logic judgment signal-1 | First voltage dividing signal | Third comparison signal-1 | Second logic judgment signal-0 | Second comparison signal-0 | First inverting signal-0 | Perform booting action only |

In this embodiment, when the first trigger signal PHONE_ON is a booting signal and the second trigger signal Recovery is a recovery signal, the first logic judgment unit 1111 is configured to generate a third logic judgment signal according to the booting signal and the recovery signal; the bleeder circuit 1112 is configured to perform voltage dividing processing on the third logic judgment signal to generate a second voltage dividing signal; the first comparison unit 1113 is configured to generate a third comparison signal according to the second voltage dividing signal and the recovery signal, so that the recovery control module 150 does not perform the recovery action according to the third comparison signal; the second logic judgment unit 1121 is configured to generate a second logic judgment signal according to the booting signal and the recovery signal; the second comparison unit 1122 is configured to output an uncertain signal according to the second voltage dividing signal and the second logic judgment signal; and the inverting unit 1123 is configured to generate a second inverting signal according to the third logic judgment signal, so that the booting control module 140 does not perform the booting action according to the uncertain signal and the second inverting signal.

As shown in Table 3, when the first trigger signal PHONE_ON is a booting signal and the second trigger signal Recovery is a recovery signal, that is, the user triggers the power-on button, so that the power-on button generates a low-level booting signal; since the user triggers the recovery button, the recovery button generates a low-level recovery signal. The first logic judgment unit 1111 correspondingly signal. The first comparator U1 in the first comparison unit 1113 generates a signal with uncertain level according to the second voltage dividing signal and the recovery signal. Because one end of the first resistor R1 is electrically connected to the power supply, the uncertain signal output by the first comparator U1 will be increased to the high-level third comparison signal, that is, the second control signal Recovery_ON at this time is the third comparison signal. The recovery control module 150 does not perform the recovery action according to the high-level second control signal Recovery_ON. The second comparison unit 1122 generates a signal with uncertain level according to the second voltage dividing signal and the second logic judgment signal, that is, the fourth processing signal Boot_ON_2 at this time is the signal with uncertain level. The inverting unit 1123 generates a high-level second inverting signal according to the third logic judgment signal, that is, the fifth processing signal Boot_OR_2 at this time is the second inverting signal. Because the fourth processing signal Boot_ON_2 with uncertain level and the second inverting signal are input to the same port of the booting control module 140, and because the second inverting signal is at a high level, the second inverting signal will increase the fourth processing signal Boot_ON_2 to be a high-level signal, so the first control signal Boot_ON at this time is at a high level. The booting control module 140 does not perform the booting action according to the high-level first control signal Boot_ON.

TABLE 3

| Booting trigger module | Recovery trigger module | First logic judgment unit | Bleeder circuit | First comparison unit | Second logic judgment unit | Second comparison unit | Inverting unit | Action of electronic device |
|---|---|---|---|---|---|---|---|---|
| Booting signal-0 | Recovery signal-0 | Third logic judgment signal-0 | Second voltage dividing signal | Third comparison signal-1 | Second logic judgment signal-0 | — | Second Inverting signal-1 | Not perform booting and recovery actions |

In this embodiment, when the first trigger signal PHONE_ON is a non-booting signal and the second trigger signal Recovery is a non-recovery signal, the first logic judgment unit 1111 is configured to generate a first logic judgment signal according to the non-booting signal and the non-recovery signal; the bleeder circuit 1112 is configured to perform voltage dividing processing on the first logic judgment signal to generate a first voltage dividing signal; the first comparison unit 1113 is configured to generate a third comparison signal according to the first voltage dividing signal and the non-recovery signal, so that the recovery control module 150 does not perform the recovery action according to the third comparison signal; the second logic judgment unit 1121 is configured to generate a fourth logic judgment signal according to the non-booting signal and the non-recovery signal; the second comparison unit 1122 is configured to generate a fourth comparison signal according to the first voltage dividing signal and the fourth logic judgment signal; and the inverting unit 1123 is configured to generate a first inverting signal according to the first logic judgment signal, so that the booting control module 140 does not perform the booting action according to the fourth comparison signal and the first inverting signal.

As shown in Table 4, when the first trigger signal PHONE_ON is a non-booting signal and the second trigger signal Recovery is a non-recovery signal, that is, the user does not trigger the power-on button, so that the power-on button generates a high-level non-booting signal; since the user does not trigger the recovery button, the recovery button generates a high-level non-recovery signal. The first logic judgment unit 1111 correspondingly generates a high-level first logic judgment signal according to the non-recovery signal and the non-booting signal, that is, the first processing signal Boot_OR at this time is the first logic judgment signal. The second logic judgment unit 1121 correspondingly generates a high-level fourth logic judgment signal according to the non-recovery signal and the non-booting signal, that is, the third processing signal Boot_AND at this time is the fourth logic judgment signal. The bleeder circuit 1112 performs voltage dividing processing on the first logic judgment signal to obtain a first voltage dividing signal with a level lower than that of the fourth logic judgment signal and the non-recovery signal, that is, the second processing signal Boot_OR_1 at this time is the first voltage dividing signal. The first comparator U1 in the first comparison unit 1113 generates a high-level third comparison signal according to the first voltage dividing signal and the non-recovery signal, that is, the second control signal Recovery_ON at this time is the third comparison signal. The recovery control module 150 does not perform the recovery action according to the high-level second control signal Recovery_ON. The second comparison unit 1122 generates a high-level fourth comparison signal according to the first voltage dividing signal and the fourth logic judgment signal, that is, the fourth processing signal Boot_ON_2 at this time is the fourth comparison signal. The inverting unit 1123 generates a low-level first inverting signal according to the first logic judgment signal, that is, the fifth processing signal Boot_OR_2 at this time is the first inverting signal. Because the fourth comparison signal and the first inverting signal are input to the same port of the booting control module 140, and because the fourth comparison signal is at a high level, the fourth comparison signal will increase the first inverting signal be a high-level signal, so the first control signal Boot_ON at this time is at a high level. The booting control module 140 does not perform the booting action according to the high-level first control signal Boot_ON.

TABLE 4

| Booting trigger module | Recovery trigger module | First logic judgment unit | Bleeder circuit | First comparison unit | Second logic judgment unit | Second comparison unit | Inverting unit | Action of electronic device |
|---|---|---|---|---|---|---|---|---|
| Non-Booting signal-1 | Non-recovery signal-1 | First logic judgment signal-1 | First voltage dividing signal | Third comparison signal-1 | Fourth logic judgment signal-1 | Fourth comparison signal-1 | First Inverting signal-0 | Not perform booting and recovery actions |

Figure 3:
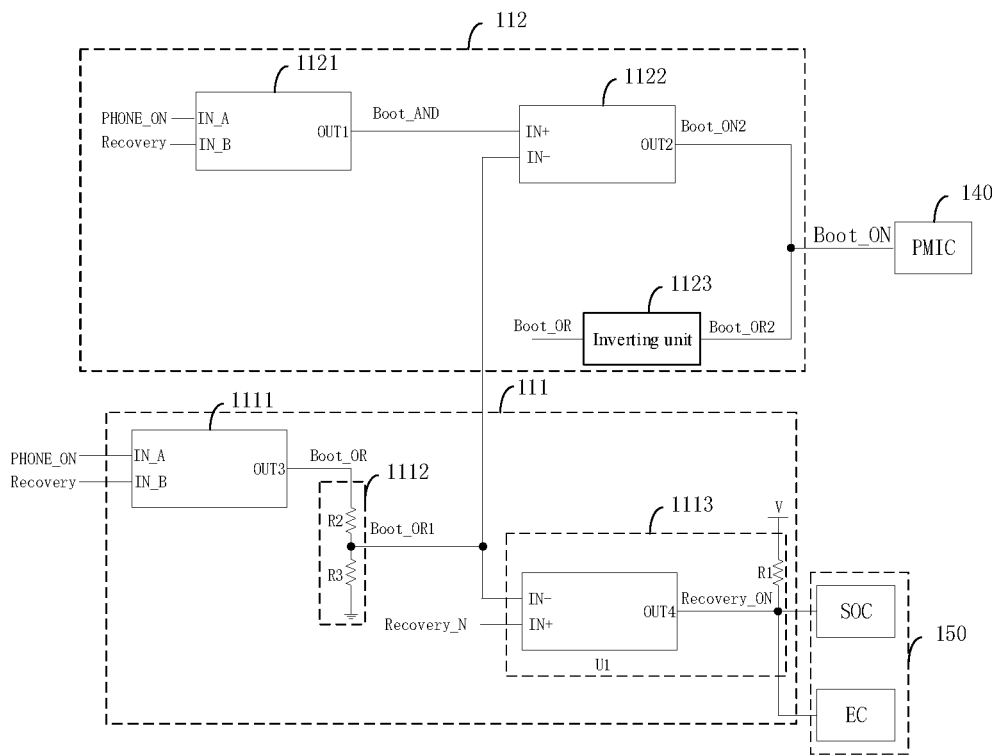
FIG. 3 illustrates a schematic circuit diagram of the flashing apparatus provided by the embodiment of the present disclosure.
Figure 4:
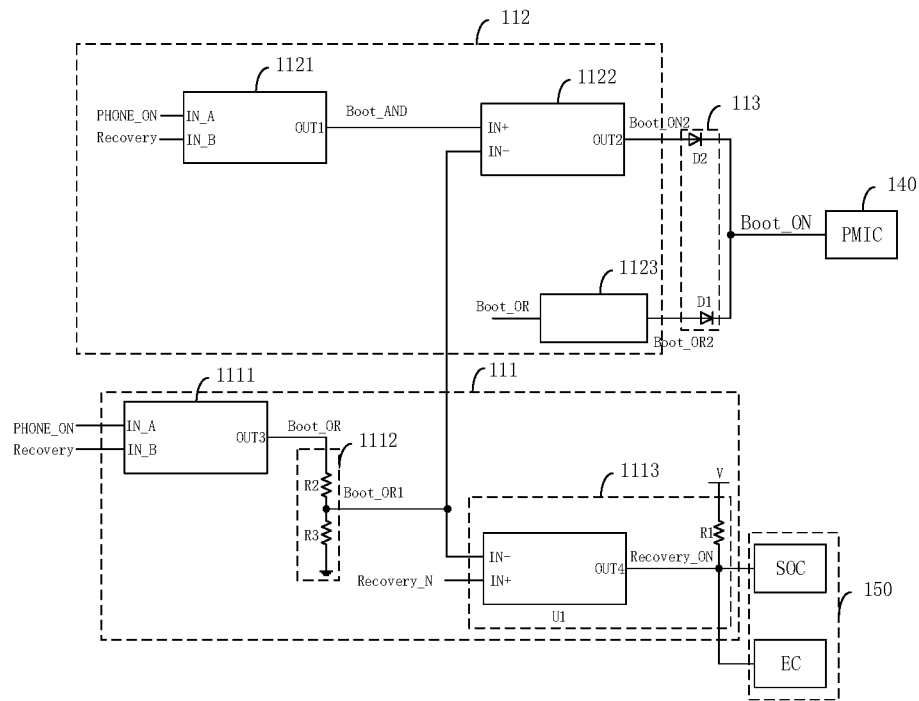
FIG. 4 illustrates a schematic circuit diagram of another flashing apparatus provided by an embodiment of the present disclosure.

To prevent the fifth processing signal generated by the inverting unit 1123 from affecting the second comparison unit 1122 and prevent the fourth processing signal generated by the second comparison unit 1122 from affecting the inverting unit 1123, please refer to FIG. 4, which is another applicable schematic circuit diagram of the flashing apparatus 110 provided by an embodiment of the present disclosure. The difference between the flashing apparatus 110 shown in FIG. 4 and the flashing apparatus 110 shown in FIG. 3 is that the booting processing module 112 further includes a backflow prevention unit 113. The second comparison unit 1122 and the inverting unit 1123 are both electrically connected to the booting control module 140 through the backflow prevention unit 113.

In this embodiment, the second comparison unit 1122 is configured to provide the fourth processing signal to the booting control module 140 through the backflow prevention unit 113; and the inverting unit 1123 is configured to provide the fifth processing signal to the booting control module 140 through the backflow prevention unit 113. Because the backflow prevention unit 113 has a function of preventing current backflow, the fourth processing signal Boot_ON_2 generated by the second comparison unit 1122 cannot flow backward to the inverting unit 1123, while the fifth processing signal Boot_OR_2 generated by the inverting unit 1123 cannot flow backward to the second comparison unit 1122.

FIG. 4 is a schematic circuit diagram of another applicable flashing apparatus 110 provided by an embodiment of the present disclosure. The backflow prevention unit 113 includes a first diode D1 and a second diode D2. The output end of the inverting unit 1123 is electrically connected to an anode of the first diode D1, the output end of the second comparison unit 1122 is electrically connected to an anode of the second diode D2, and a cathode of the first diode D1 and a cathode of the second diode D2 are both electrically connected to the booting control module 140.

It is to be understood that the first diode D1 is configured to prevent the fourth processing signal Boot_ON_2 generated by the second comparison unit 1122 from flowing backward to the inverting unit 1123, and the second diode D2 is configured to prevent the fifth processing signal Boot_OR_2 generated by the inverting unit 1123 from flowing backward to the second comparison unit 1122.

Figure 5:
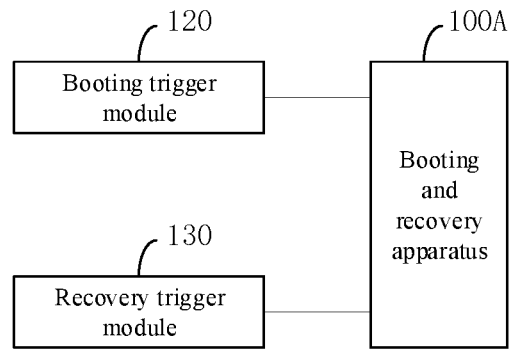
FIG. 5 illustrates a schematic structural diagram of an electronic device provided by an embodiment of the present disclosure.

Please refer to FIG. 5. FIG. 5 is an applicable schematic structural diagram of an electronic device 100 provided by an embodiment of the present disclosure. The electronic device 100 includes a recovery trigger module 130 and a booting and recovery apparatus 100A. The recovery trigger module 130 is electrically connected to the booting and recovery apparatus 100A. The recovery trigger module 130 is configured to provide a recovery signal to the booting and recovery apparatus 100A, and the booting and recovery apparatus 100A is configured to obtain a working voltage according to the recovery signal, and perform a recovery operation and a booting operation.

In this embodiment, the electronic device 100 may be a notebook computer, a tablet computer, and the like. The recovery trigger module 130 may include a recovery button. When receiving a pressing operation of a user on the recovery button, the recovery button will generate a recovery signal in response to the pressing operation of the user. When no pressing operation of the user on the recovery button is received, the recovery button will generate a non-recovery signal. The recovery signal is a low-level signal (for example, 0 V) and the non-recovery signal is a high-level signal (for example, 3.3 V).

Optionally, in this embodiment, the electronic device 100 further includes a booting trigger module 120, and the booting trigger module 120 is electrically connected to the booting and recovery apparatus 100A. The booting trigger module 120 is configured to provide a booting signal to the booting and recovery apparatus 100A, and the booting and recovery apparatus 100A is configured to perform a booting operation according to the booting signal.

In this embodiment, the booting trigger module 120 may include a power-on button. When receiving a pressing operation of the user on the power-on button, the power-on button will generate a booting signal in response to the pressing operation of the user. When no pressing operation of the user on the power-on button is received, the power-on button will generate a non-booting signal. The booting signal is a low-level signal (for example, 0 V) and the non-booting signal is a high-level signal (for example, 3.3 V).

Figure 6:
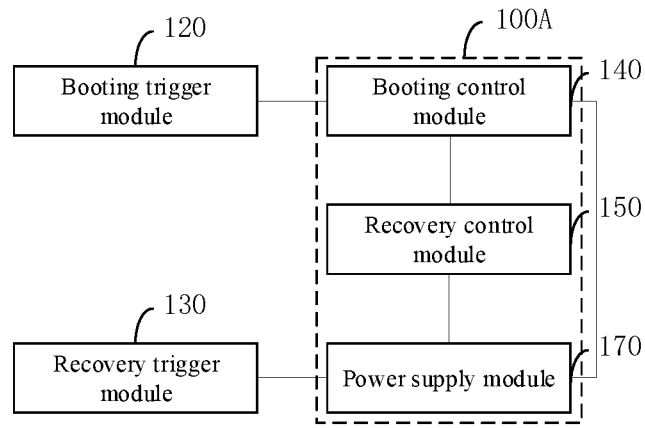
FIG. 6 illustrates a schematic structural diagram of a booting and recovery apparatus provided by an embodiment of the present disclosure.

Please refer to FIG. 6, which is an applicable schematic structural diagram of the booting and recovery apparatus 100A shown in FIG. 5. The booting and recovery apparatus 100A includes the booting control module 140, the recovery control module 150 and a power supply module 170. The recovery trigger module 130, the power supply module 170, the recovery control module 150 and the booting control module 140 are electrically connected in sequence.

In this embodiment, the power supply module 170 is configured to provide the working voltage to the recovery control module 150 according to the recovery signal provided by the recovery trigger module 130; the power supply module 170 is also configured to send the recovery processing signal to the recovery control module 150 according to the recovery signal; the recovery control module 150 is configured to perform, in the case of receiving the working voltage, a recovery operation according to the recovery processing signal and send a booting processing signal to the booting control module 140 according to the recovery processing signal; and the booting control module 140 is configured to perform a booting operation according to the booting processing signal.

It can be understood that when the user does not perform a pressing operation on the recovery trigger module 130, the recovery trigger module 130 has no recovery signal to be provided to the power supply module 170. When the power supply module 170 does not receive a recovery signal, the power supply module 170 will not generate a working voltage. Without the working voltage, the recovery control module 150 will not perform a recovery operation, and will not generate a booting processing signal to the booting control module 140, so the booting control module 140 will not perform a booting operation. Since the power supply module 170 has no working voltage to be provided to the recovery control module 150, when the recovery control module 150 does not perform a recovery operation and is in a standby state, no electric energy will be consumed.

Figure 7:
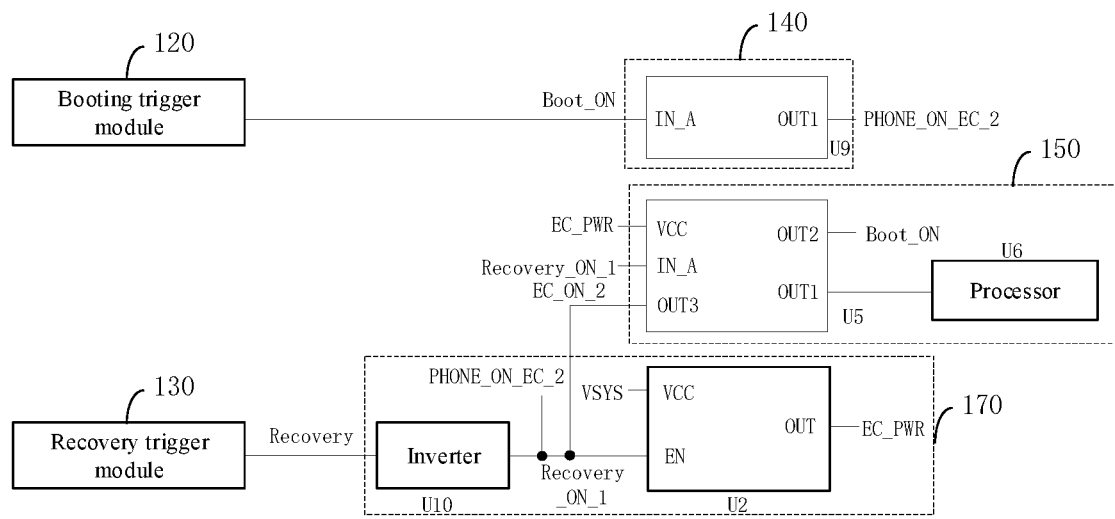
FIG. 7 illustrates a schematic circuit diagram of the booting and recovery apparatus provided by the embodiment of the present disclosure.

Please refer to FIG. 7, which is an applicable schematic circuit diagram of the booting and recovery apparatus 100A shown in FIG. 6. The power supply module 170 includes an inverter U10 and a first power chip U2. The recovery trigger module 130 is electrically connected to the first power chip U2 and the recovery control module 150 respectively through the inverter U10, and the first power chip U2 is also electrically connected to the recovery control module 150.

In this embodiment, the inverter U10 is configured to perform inverting processing on the recovery signal Recovery to obtain the recovery processing signal Recovery_ON_1; and the first power chip U2 is configured to provide the working voltage EC_PWR to the recovery control module 150 according to the recovery processing signal Recovery_ON_1. The inverter U10 is also configured to transmit the recovery processing signal Recovery_ON_1 to the recovery control module 150.

It can be understood that the inverter U10 performs inverting processing on the low-level recovery signal Recovery to obtain the high-level recovery processing signal Recovery_ON_1, and the first power chip U2 will generate the working voltage EC_PWR after obtaining the high-level recovery processing signal Recovery_ON_1.

If the user does not trigger the recovery button, the inverter U10 will receive a high-level non-recovery signal, and the inverter U10 will obtain a low-level non-recovery processing signal by inverting processing, while the first power chip U2 will not generate the working voltage EC_PWR in response to receiving the low-level non-recovery processing signal.

The inverter U10 is electrically connected to an enable end of the first power chip U2. When the enable end of the first power chip U2 obtains a high-level signal, the first power chip U2 will work, so as to generate the working voltage EC_PWR. The first power chip U2 is configured to convert a system voltage VSYS of the electronic device 100 to obtain the working voltage EC_PWR. The first power chip U2 may be a DC-DC (direct current to direct current) conversion chip.

In this embodiment, the recovery control module 150 includes a controller U5 and a processor U6. An input end of the controller U5 is electrically connected to the power supply module 170, a power supply end of the controller U5 is electrically connected to the power supply module 170, a first output end of the controller U5 is electrically connected to the processor U6, a second output end of the controller U5 is electrically connected to the booting control module 140, and a third output end of the controller U5 is electrically connected to the power supply module 170.

The controller U5 is configured to, in the case of receiving the working voltage, control the processor U6 to perform the recovery operation according to the recovery processing signal Recovery_ON_1 received by the input end of the controller U5. The controller U5 is also configured to send a booting processing signal Boot_ON to the booting control module 140 according to the recovery processing signal Recovery_ON_1. The controller U5 is also configured to send a second enable signal EC_ON_2 to the power supply module 170 in the case of receiving the working voltage EC_PWR. The power supply module 170 is configured to continuously provide the working voltage EC_PWR to the controller U5 according to the second enable signal EC_ON_2.

It can be understood that the third output end of the controller U5 is electrically connected to the enable end of the first power chip U2, wherein the second enable signal EC_ON_2 is a high-level signal. The enable end of the first power chip U2 can continuously provide the working voltage to the controller U5 in case of receiving the high-level second enable signal EC_ON_2. Even when the user stops pressing the recovery button, the inverter U10 provides the first power chip U2 with the low-level non-recovery processing signal, the first power chip U2 can also provide the working voltage EC_PWR to the controller U5, so that the controller U5 can complete the recovery operation. When receiving the high-level recovery processing signal Recovery_ON_1, the input end of the controller U5 will generate a high-level control signal to the processor U6, so that the processor U6 will perform the recovery operation after receiving the high-level control signal. The controller U5 is also configured to send a low-level booting processing signal Boot_ON to the booting control module 140 according to the high-level recovery processing signal Recovery_ON_1.

The controller U5 may be an Embedded Controller (EC), and the processor U6 may be a System on Chip (SOC).

In this embodiment, the booting control module 140 is also electrically connected to the power supply module 170. The power supply module 170 is configured to provide the working voltage EC_PWR to the recovery control module 150 according to the first enable signal PHONE_ON_EC_2 provided by the booting control module 140; wherein, the first enable signal PHONE_ON_EC_2 is generated when the booting control module 140 performs a booting operation.

It can be understood that the first enable signal PHONE_ON_EC_2 is a high-level signal, and the booting control module 140 is electrically connected to the enable end of the first power chip U2. The enable end of the first power chip U2 can continuously provide the working voltage EC_PWR to the controller U5 in case of receiving the high-level first enable signal PHONE_ON_EC_2. Even when the user stops pressing the recovery button, the inverter U10 provides the first power chip U2 with the low-level non-recovery processing signal, the first power chip U2 can also provide the working voltage EC_PWR to the controller U5, so that the controller U5 can complete the recovery operation.

Figure 8:
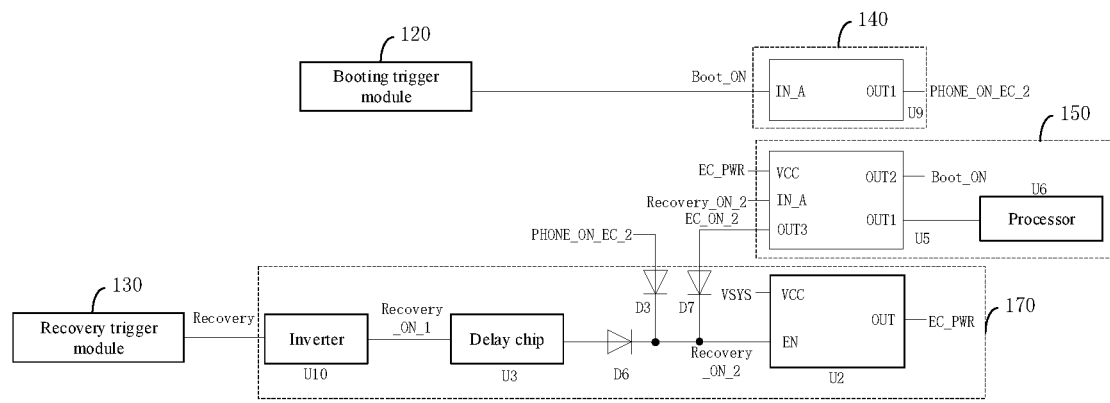
FIG. 8 illustrates a schematic circuit diagram of another booting and recovery apparatus provided by an embodiment of the present disclosure.

Optionally, as shown in FIG. 8, the power supply module 170 further includes a delay chip U3. The inverter U10 is electrically connected to the first power chip U2 and the recovery control module 150 through the delay chip U3 respectively. The delay chip U3 is configured to perform delay processing on the recovery processing signal Recovery_ON_1 to obtain a delayed recovery processing signal Recovery_ON_2. The first power chip U2 is configured to provide the working voltage EC_PWR to the recovery control module 150 according to the delayed recovery processing signal Recovery_ON_2. The recovery control module 150 is configured to perform, in the case of receiving the working voltage EC_PWR, a recovery operation according to the delayed recovery processing signal Recovery_ON_2 and send a booting processing signal Boot_ON to the booting control module 140 according to the delayed recovery processing signal Recovery_ON_2.

It can be understood that the delay chip U3 is configured to perform delay processing on the recovery processing signal Recovery_ON_1, so that the recovery processing signal Recovery_ON_1 lasts for a period of time to ensure that the enable end of the first power chip U2 can continuously receive the high-level signal after the controller U5 works and before the second enable signal EC_ON_2 is sent to the first power chip U2. The delay chip U3 enables the recovery processing signal Recovery_ON_1 to be sent to the first power chip U2 continuously for 500 seconds.

Optionally, in this embodiment, the power supply module 170 further includes a sixth diode D6. The delay chip U3 is electrically connected to an anode of the sixth diode D6, and a cathode of the sixth diode D6 is electrically connected to the first power chip U2. The sixth diode D6 is configured to prevent a current produced by the first power chip U2 from flowing back to the delay chip U3. The cathode of the sixth diode D6 is electrically connected to the enable end of the first power chip U2.

Optionally, in this embodiment, the power supply module 170 further includes a seventh diode D7. The third output end of the controller U5 of the recovery control module 150 is electrically connected to an anode of the seventh diode D7, and a cathode of the seventh diode D7 is electrically connected to the enable end of the first power chip U2. The recovery control module 150 is also configured to, in the case of receiving the working voltage, send a second enable signal to the enable end of the first power chip U2 through the seventh diode D7, and the first power chip U2 continuously provides the working voltage to the controller U5 according to the second enable signal.

Optionally, in this embodiment, the power supply module 170 further includes a third diode D3. The booting control module 140 is electrically connected to an anode of the third diode D3, and a cathode of the third diode D3 is electrically connected to the enable end of the first power chip U2. The booting control module 140 sends the first enable signal to the enable end of the first power chip U2 through the third diode D3, and the first power chip U2 continuously provides the working voltage to the controller U5 according to the first enable signal.

Figure 9:
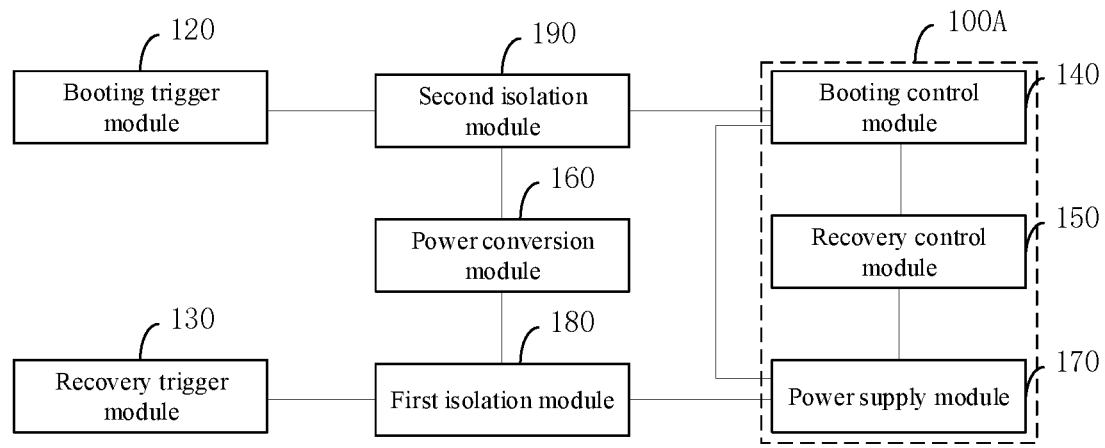
FIG. 9 illustrates a schematic structural diagram of another booting and recovery apparatus provided by an embodiment of the present disclosure.
Figure 10:
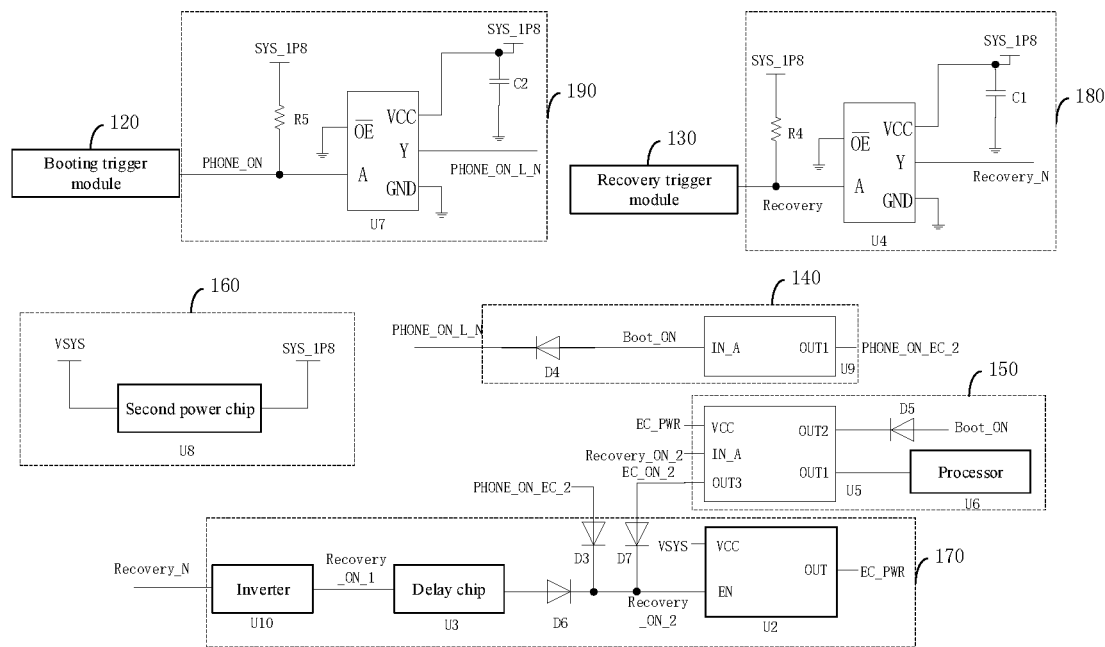
FIG. 10 illustrates a schematic circuit diagram of another booting and recovery apparatus provided by an embodiment of the present disclosure.

Optionally, FIG. 9 is an another applicable schematic structural diagram of the booting and recovery apparatus 100A provided by the embodiment. The booting and recovery apparatus 100A further includes a first isolation module 180. The recovery trigger module 130 is electrically connected to the power supply module 170 through the first isolation module 180. As shown in FIG. 10, the first isolation module 180 is configured to perform isolation processing on the recovery signal Recovery to obtain an isolated recovery signal Recovery_N; the power supply module 170 is configured to provide the working voltage EC_PWR to the recovery control module 150 according to the isolated recovery signal Recovery_N; and the power supply module 170 is also configured to send the recovery processing signal Recovery_ON_2 to the recovery control module 150 according to the isolated recovery signal. It can be understood that the recovery trigger module 130, the first isolation module 180, the inverter U10, the delay chip U3, the sixth diode D6 and the first power chip U2 are electrically connected in sequence.

The first isolation module 180 includes a first buffer U4, and the recovery trigger module 130 is electrically connected to the power supply module 170 through the first buffer U4. A buffer may be employed as the first buffer U4.

Optionally, the first isolation module 180 further includes a fourth resistor R4 and a first capacitor C1. One end of the fourth resistor R4 is electrically connected between the recovery trigger module 130 and the first buffer U4, the other end of the fourth resistor R4 is electrically connected to the second power chip U8. One end of the first capacitor C1 is electrically connected between the second power chip U8 and the first buffer U4, and the other end of the first capacitor C1 is grounded.

Optionally, the booting and recovery apparatus 100A further includes a second isolation module 190, and the booting trigger module 120 is electrically connected to the booting control module 140 through the second isolation module 190. The second isolation module 190 is configured to perform isolation processing on a booting signal provided by the booting trigger module 120 to obtain an isolated booting signal; and the booting control module 140 is configured to perform a booting operation according to the isolated booting signal.

In this embodiment, the second isolation module 190 includes a second buffer U7, a fifth resistor R5 and a second capacitor C2. The booting trigger module 120 is electrically connected to the booting control module 140 through the second buffer U7. One end of the fifth resistor R5 is electrically connected between the booting trigger module 120 and the second buffer U7, and the other end of the fifth resistor R5 is electrically connected to the second power chip U8. One end of the second capacitor C2 is electrically connected between the second power chip U8 and the second buffer U7, and the other end of the second capacitor C2 is grounded.

The first buffer U4 and the second buffer U7 are both used to play the role of electrical isolation, which can electrically isolate the recovery signal from the booting signal and prevent mutual interference between the recovery signal and the booting signal.

Optionally, in this embodiment, the booting control module 140 includes a third power chip U9 (Power Management IC, PMIC) and a fourth diode D4. The second buffer U7 is electrically connected to a cathode of the fourth diode D4, an anode of the fourth diode D4 is electrically connected to an input end of the third power chip U9, an output end of the third power chip U9 is electrically connected to an anode of the third diode D3, and the second output end of the controller U5 is electrically connected between the anode of the fourth diode D4 and the input end of the third power chip U9. When receiving a low-level signal, the input end of the third power chip U9 will perform a booting operation. The fourth diode D4 is used to prevent the booting processing signal generated by the controller U5 from affecting the second buffer U7. Optionally, the recovery control module 150 further includes a fifth diode D5. An anode of the fifth diode D5 is electrically connected between the anode of the fourth diode D4 and the input end of the third power chip U9, and a cathode of the fifth diode D5 is electrically connected to the second output end of the controller U5. The fifth diode D5 is used to prevent a signal between the anode of the fourth diode D4 and the input end of the third power chip U9 from affecting the controller U5.

Optionally, the booting and recovery apparatus 100A further includes a power conversion module 160. The power conversion module 160 includes a second power chip U8, and the second power chip U8 is configured to convert a system voltage VSYS provided by the electronic device 100 into a voltage needed by the first buffer U4 and the second buffer U7 to work. For example, the system voltage may be 3.3 V, and the voltage needed by the first buffer U4 and the second buffer U7 to work may be 1.8 V. Consequently, the second power chip U8 is a DC-DC conversion chip that converts a direct current of 3.3 V to 1.8 V.

Meanwhile, the booting and recovery operations of the electronic device can be realized by the recovery trigger module and the recovery control module, and the restore operation does not need to be performed by the combination of the power button and the +/− volume button, which not only uses fewer components, but also is more convenient and faster to operate.

In conclusion, the embodiments of the present disclosure provide the flashing apparatus and the electronic device. According to the flashing apparatus, the booting processing module provides, according to the first trigger signal provided by the booting trigger module and the second trigger signal provided by the recovery trigger module, the first control signal to the booting control module, so that the booting control module determines whether to perform the booting action according to the first control signal; and the recovery processing module provides, according to the first trigger signal and the second trigger signal, the second control signal to the recovery control module, so that the recovery control module determines whether to perform the recovery action according to the second control signal. It can be seen that the booting action and the recovery action can be performed by the booting trigger module, the recovery trigger module, the booting control module, the recovery control module and the flashing apparatus, and the booting action and the recovery action can also be guaranteed not to conflict. The booting and recovery apparatus includes the booting control module, the recovery control module and the power supply module. The recovery trigger module, the power supply module, the recovery control module and the booting control module are electrically connected in sequence. The power supply module is configured to provide the working voltage to the recovery control module according to the recovery signal provided by the recovery trigger module; the power supply module is also configured to send the recovery processing signal to the recovery control module according to the recovery signal; the recovery control module is configured to, in the case of receiving the working voltage, perform the recovery operation according to the recovery processing signal and send the booting processing signal to the booting control module according to the recovery processing signal; and the booting control module is configured to perform the booting operation according to the booting processing signal. It can be seen that the power supply module will only provide the working voltage to the recovery control module when the electronic device is performing the recovery operation, and the recovery control module can only perform the recovery operation after obtaining the working voltage. When the electronic device does not need to perform the recovery operation, the power supply module will not provide the working voltage to the recovery control module, so the recovery control module does not need to be powered on when the recovery control module does not need to perform the recovery operation, so the recovery control module will not consume the electric energy of the electronic device when the recovery control module does not need to perform the recovery operation, thus reducing the power losses of the electronic device and saving the electric energy.

The above descriptions are merely preferred embodiments of the present disclosure and are not intended to limit the present disclosure. For those skilled in the art, the present disclosure may have various modifications and changes. Any modification, equivalent replacement, and/or improvement made without departing from the spirit and principle of the present disclosure shall fall within the protection scope of the present disclosure.

INDUSTRIAL APPLICABILITY

The booting processing module provides, according to the first trigger signal provided by the booting trigger module and the second trigger signal provided by the recovery trigger module, the first control signal to the booting control module, so that the booting control module determines whether to perform the booting action according to the first control signal; and the recovery processing module provides, according to the first trigger signal and the second trigger signal, the second control signal to the recovery control module, so that the recovery control module determines whether to perform the recovery action according to the second control signal. It can be seen that the booting action and the recovery action can be performed by the booting trigger module, the recovery trigger module, the booting control module, the recovery control module and the flashing apparatus, and the booting action and the recovery action can also be guaranteed not to conflict. Meanwhile, the power supply module provides, according to the recovery signal provided by the recovery trigger module, the working voltage to the recovery control module, and provides the recovery processing signal to the recovery control module at the same time; so that the recovery control module, in the case of receiving the working voltage, performs the recovery operation according to the recovery processing signal and sends the booting processing signal to the booting control module according to the recovery processing signal; so that the booting control module performs the booting operation according to the booting processing signal. It can be seen that the power supply module will only provide the working voltage to the recovery control module when the electronic device is performing the recovery operation, and the recovery control module can only perform the recovery operation after obtaining the working voltage. When the electronic device does not need to perform the recovery operation, the power supply module will not provide the working voltage to the recovery control module, so the recovery control module does not need to be powered on when the recovery control module does not need to perform the recovery operation, so the recovery control module will not consume the electric energy of the electronic device when the recovery control module does not need to perform the recovery operation, thus reducing the power losses of the electronic device and saving the electric energy.

What is claimed is:

1. A flashing apparatus, wherein the flashing apparatus is applied to an electronic device, and the electronic device comprises a booting trigger module, a recovery trigger module, a booting control module and a recovery control module; the flashing apparatus comprises a booting processing module and a recovery processing module electrically connected to the booting processing module;

the booting trigger module and the recovery trigger module are both electrically connected to the booting control module through the booting processing module, and the booting trigger module and the recovery trigger module are both electrically connected to the recovery control module through the recovery processing module;

the booting processing module is configured to provide, according to a first trigger signal provided by the booting trigger module and a second trigger signal provided by the recovery trigger module, a first control signal to the booting control module, so that the booting control module determines whether to perform a booting action according to the first control signal; and the recovery processing module is configured to provide, according to the first trigger signal and the second trigger signal, a second control signal to the recovery control module, so that the recovery control module determines whether to perform a recovery action according to the second control signal.

2. The flashing apparatus according to claim 1, wherein the recovery processing module comprises a first logic judgment unit, a bleeder circuit and a first comparison unit, the booting trigger module and the recovery trigger module are electrically connected to an input end of the first logic judgment unit respectively, an output end of the first logic judgment unit is electrically connected to an input end of an inverting unit of the booting processing module, the output end of the first logic judgment unit is also electrically connected to an input end of the first comparison unit and an input end of a second comparison unit of the booting processing module respectively through the bleeder circuit, the recovery trigger module is electrically connected to the input end of the first comparison unit, and an output end of the first comparison unit is electrically connected to the recovery control module;

the first logic judgment unit is configured to generate a first processing signal according to the first trigger signal and the second trigger signal;

the bleeder circuit is configured to perform voltage dividing processing on the first processed signal to generate a second processed signal; and the first comparison unit is configured to generate the second control signal according to the second processing signal and the second trigger signal.

3. The flashing apparatus according to claim 2, wherein the first comparison unit comprises a first comparator and a first resistor, an input end of the first comparator is electrically connected to both an output end of the bleeder circuit and the recovery trigger module, an output end of the first comparator is electrically connected to the recovery control module, one end of the first resistor is electrically connected to a power supply, and the other end of the first resistor is electrically connected between the output end of the first comparator and the recovery control module.

4. The flashing apparatus according to claim 2, wherein the booting processing module further comprises a second logic judgment unit, the booting trigger module and the recovery trigger module are electrically connected to an input end of the second logic judgment unit respectively, an output end of the second logic judgment unit is electrically connected to the input end of the second comparison unit, and an output end of the second comparison unit and an output end of the inverting unit are both electrically connected to the booting control module;

the second logic judgment unit is configured to generate a third processing signal according to the first trigger signal and the second trigger signal;

the second comparison unit is configured to generate a fourth processing signal according to the third processing signal and the second processing signal; and the inverting unit is configured to generate a fifth processing signal according to the first processing signal, so that the booting control module obtains the first control signal according to the fourth processing signal and the fifth processing signal.

5. The flashing apparatus according to claim 4, wherein the booting processing module further comprises a backflow prevention unit, and the second comparison unit and the inverting unit are both electrically connected to the booting control module through the backflow prevention unit;

the second comparison unit is configured to provide the fourth processing signal to the booting control module through the backflow prevention unit; and the inverting unit is configured to provide the fifth processing signal to the booting control module through the backflow prevention unit.

6. The flashing apparatus according to claim 5, wherein the backflow prevention unit comprises a first diode and a second diode, the output end of the inverting unit is electrically connected to an anode of the first diode, the output end of the second comparison unit is electrically connected to an anode of the second diode, and a cathode of the first diode and a cathode of the second diode are both electrically connected to the booting control module.

7. The flashing apparatus according to claim 4, wherein the first trigger signal comprises a non-booting signal, and the second trigger signal comprises a recovery signal;

the first logic judgment unit is configured to generate a first logic judgment signal according to the recovery signal and the non-booting signal;

the bleeder circuit is configured to perform voltage dividing processing on the first logic judgment signal to generate a first voltage dividing signal;

the first comparison unit is configured to generate a first comparison signal according to the first voltage dividing signal and the recovery signal, so that the recovery control module performs the recovery action according to the first comparison signal;

the second logic judgment unit is configured to generate a second logic judgment signal according to the recovery signal and the non-booting signal;

the second comparison unit is configured to generate a second comparison signal according to the first voltage dividing signal and the second logic judgment signal; and the inverting unit is configured to generate a first inverting signal according to the first logic judgment signal, so that the booting control module performs the booting action according to the second comparison signal and the first inverting signal.

8. The flashing apparatus according to claim 4, wherein the first trigger signal comprises a booting signal, and the second trigger signal comprises a non-recovery signal;

the first logic judgment unit is configured to generate a first logic judgment signal according to the booting signal and the non-recovery signal;

the bleeder circuit is configured to perform voltage dividing processing on the first logic judgment signal to generate a first voltage dividing signal;

the first comparison unit is configured to generate a third comparison signal according to the first voltage dividing signal and the non-recovery signal, so that the recovery control module does not perform the recovery action according to the third comparison signal;

the second logic judgment unit is configured to generate a second logic judgment signal according to the booting signal and the non-recovery signal;

the second comparison unit is configured to generate a second comparison signal according to the first voltage dividing signal and the second logic judgment signal; and the inverting unit is configured to generate a first inverting signal according to the first logic judgment signal, so that the booting control module performs the booting action according to the second comparison signal and the first inverting signal.

9. The flashing apparatus according to claim 4, wherein the first logic judgment unit comprises an OR gate, and the second logic judgment unit comprises an AND gate.

10. A booting and recovery apparatus, wherein the booting and recovery apparatus is applied to an electronic device, the electronic device comprises a recovery trigger module, the booting and recovery apparatus comprises a booting control module, a recovery control module and a power supply module, and the recovery trigger module, the power supply module, the recovery control module and the booting control module are electrically connected in sequence;

the power supply module is configured to provide a working voltage to the recovery control module according to a recovery signal provided by the recovery trigger module;

the power supply module is also configured to send a recovery processing signal to the recovery control module according to the recovery signal;

the recovery control module is configured to perform, in the case of receiving the working voltage, a recovery operation according to the recovery processing signal and send a booting processing signal to the booting control module according to the recovery processing signal; and the booting control module is configured to perform a booting operation according to the booting processing signal.

11. The booting and recovery apparatus according to claim 10, wherein the power supply module comprises an inverter and a first power chip, the recovery trigger module is electrically connected to the first power chip and the recovery control module respectively through the inverter, and the first power chip is also electrically connected to the recovery control module;

the inverter is configured to perform inverting processing on the recovery signal to obtain the recovery processing signal; and the first power chip is configured to provide the working voltage to the recovery control module according to the recovery processing signal.

12. The booting and recovery apparatus according to claim 11, wherein the power supply module further comprises a delay chip, and the inverter is electrically connected to the first power chip and the recovery control module respectively through the delay chip;

the delay chip is configured to perform delay processing on the recovery processing signal to obtain a delayed recovery processing signal;

the first power chip is configured to provide the working voltage to the recovery control module according to the delayed recovery processing signal; and the recovery control module is configured to perform, in the case of receiving the working voltage, a recovery operation according to the delayed recovery processing signal and send a booting processing signal to the booting control module according to the delayed recovery processing signal.

13. The booting and recovery apparatus according to claim 12, wherein the power supply module further comprises a sixth diode, the delay chip is electrically connected to an anode of the sixth diode, and a cathode of the sixth diode is electrically connected to the first power chip.

14. The booting and recovery apparatus according to claim 10, wherein the booting and recovery apparatus further comprises a first isolation module, and the recovery trigger module is electrically connected to the power supply module through the first isolation module;
the first isolation module is configured to perform isolation processing on the recovery signal to obtain an isolated recovery signal;
the power supply module is configured to provide the working voltage to the recovery control module according to the isolated recovery signal; and
the power supply module is also configured to send the recovery processing signal to the recovery control module according to the isolated recovery signal.

15. The booting and recovery apparatus according to claim 14, wherein the first isolation module comprises a first buffer, and the recovery trigger module is electrically connected to the power supply module through the first buffer.

16. The booting and recovery apparatus according to claim 10, wherein the booting control module is also electrically connected to the power supply module; and
the power supply module is configured to provide the working voltage to the recovery control module according to a first enable signal provided by the booting control module; wherein, the first enable signal is generated when the booting control module performs a booting operation.

17. The booting and recovery apparatus according to claim 10, wherein the recovery control module comprises a controller and a processor, an input end of the controller is electrically connected to the power supply module, a power supply end of the controller is electrically connected to the power supply module, a first output end of the controller is electrically connected to the processor, a second output end of the controller is electrically connected to the booting control module, and a third output end of the controller is electrically connected to the power supply module;
the controller is configured to control, in the case that the power supply end receives the working voltage, the processor to perform a recovery operation according to the recovery processing signal received by the input end of the controller;
the controller is also configured to send the booting processing signal to the booting control module according to the recovery processing signal;
the controller is also configured to, in the case of receiving the working voltage, send a second enable signal to the power supply module; and
the power supply module is configured to continuously provide the working voltage to the controller according to the second enable signal.

18. The booting and recovery apparatus according to claim 10, wherein the electronic device further comprises a booting trigger module, the booting and recovery apparatus further comprises a second isolation module, and the booting trigger module is electrically connected to the booting control module through the second isolation module;
the second isolation module is configured to perform isolation processing on a booting signal provided by the booting trigger module to obtain an isolated booting signal; and
the booting control module is configured to perform a booting operation according to the isolated booting signal.

19. An electronic device, comprising a booting trigger module, a recovery trigger module, a booting control module, a recovery control module, and the flashing apparatus according to claim 1.

20. An electronic device, comprising the recovery trigger module and the booting and recovery apparatus according to claim 10.

* * * * *